United States Patent [19]

Anderson et al.

[11] Patent Number: 4,500,060
[45] Date of Patent: Feb. 19, 1985

[54] SWIVEL-TILT PLATFORM

[75] Inventors: William C. Anderson, Grand Rapids; Bruce K. Boundy, Holland; Raoul J. P. Schoumaker, Wyoming, all of Mich.

[73] Assignee: Westinghouse Electric Corp., Pittsburgh, Pa.

[21] Appl. No.: 387,640

[22] Filed: Jun. 11, 1982

[51] Int. Cl.³ .............................................. A47B 91/00
[52] U.S. Cl. .................................... 248/349; 248/663
[58] Field of Search ............... 403/116; 248/660, 663, 248/371, 179, 178, 288.3, 349, 346

[56] References Cited

U.S. PATENT DOCUMENTS

| | | |
|---|---|---|
| 1,794,726 | 3/1931 | Mitchell . |
| 2,371,435 | 3/1945 | Galorneau ...................... 248/181 X |
| 2,893,674 | 7/1959 | Monaco . |
| 2,922,609 | 1/1960 | Collier . |
| 3,063,714 | 11/1962 | Krauss ............... 248/349 X |
| 3,353,776 | 11/1967 | Clemens . |
| 3,970,792 | 7/1976 | Benham . |
| 4,068,961 | 1/1978 | Ebner .............................. 248/181 X |
| 4,304,385 | 12/1981 | Farouche ...................... 248/181 X |
| 4,365,779 | 12/1982 | Bates ................................... 248/371 |
| 4,372,515 | 2/1983 | Noonan .............................. 248/178 |
| 4,415,136 | 11/1983 | Knoll ................................... 248/181 |

FOREIGN PATENT DOCUMENTS 1353555 5/1974 United Kingdom ............... 248/181

Primary Examiner—J. Franklin Foss
Attorney, Agent, or Firm—B. R. Studebaker

[57] ABSTRACT

A mounting pedestal for supporting a computer terminal display device or the like is disclosed. The mounting pedestal provides for 360° rotation of the support platform while permitting only limited front to rear tilting of the support platform. A base member includes an annular depression in the form of a segment of a sphere in its upper surface into which a complimentary spherical segment on the underside of the tilt platform rests to provide for 360° rotation of the tilt platform with respect to the stationary base. Tilting in only a front to rear mode is controlled by a pair of laterally extending cylindrical segments on the underside of the tilt platform.

7 Claims, 4 Drawing Figures

FIG. I 4,500,060

SWIVEL-TILT PLATFORM

BACKGROUND OF THE INVENTION

There has, over the past several years, been a rapid and significant growth of the use of CRT (cathode ray tube) display devices in connection with computer terminals and word processing systems in the office environment. For user comfort, it is desirable that the user be able to position the screen of the CRT to a preferred viewing angle, and also have the ability to remove annoying reflections. Additionally, it is desirable to be able to rotate the CRT screen through 360° to accommodate operators, for example, on opposite sides of a work surface to optimize the utilization of the equipment.

Several products are available on the market today which provide for swiveling and tilting of CRT screen units. Two distinct rotating motions are generally provided. A swivel motion allows rotation around a vertical axis through 360° and a tilting motion allows the screen to point at a higher or lower angle by rotation about a horizontal axis parallel to the screen face. In general, present equipment provides these motions by two separate mechanisms combined into one assembly. Although it is desirable to combine both the rotation and tilting functions in the CRT support platform, it is undesirable for the CRT screen to tilt sideways. Therefore, providing a mechanism which permits only a front to rear tilting action is extremely desirable.

SUMMARY OF THE INVENTION

In accordance with the present invention a mechanism is provided which produces both the swivel and tilt motions in one mechanism. Essentially, a male gimbal and a female spherical mating surface are provided to accomplish the motion but broadly such mechanism would have three degrees of motion, rotation about the vertical and two different horizontal axes. Since it is undesirable for a CRT screen to tilt sideways, means has been combined into the gimbal in the form of a pair of laterally disposed cylindrical segments which prevent any side tilt of the support platform.

The mounting pedestal for supporting a computer terminal display device or the like of this invention comprises a base portion having a flat upper peripheral surface, an annular inwardly and downwardly sloped spherical segment interiorly of the flat upper peripheral surface and a central aperture through the base portion combined with a tilt platform having a central spherical segment bottom portion having a central aperture therethrough and laterally extending cylindrical segments extending outwardly of the spherical segment. The spherical segment bottom portion of the tilt platform is complimentary to and constructed and arranged to rest on the spherical segment in the base portion with the outwardly extending cylindrical segments overlying the flat upper peripheral surface on the base portion. A platform top overlies the tilt platform. This platform top includes a planar upper surface with a central aperture therethrough and at least one trough portion in the planar upper surface interconnecting one edge of the platform top with the central aperture. The at least one trough portion may be a pair of spaced arcuate trough portions which interconnect the rear edge of the platform top with the central aperture. The upper surface of the inwardly and downwardly sloped spherical segments on the mounting pedestal may include a plurality of hemispherical depressions therein which receive a ballbearing like sphere in each of the hemispherical depressions in order that the spherical segment bottom portion of the tilt platform can rest for rotation on the ballbearing like spheres. Moreover, the platform top may be secured to the tilt platform to form a unitary member.

BRIEF DESCRIPTION OF THE DRAWING

Many of the attendant advantages of the present invention will become more readily apparent and better understood as the following detail description is considered in connection with the accompanying drawing in which.

DESCRIPTION OF THE PREFERRED EMBODIMENT

Figure 1:
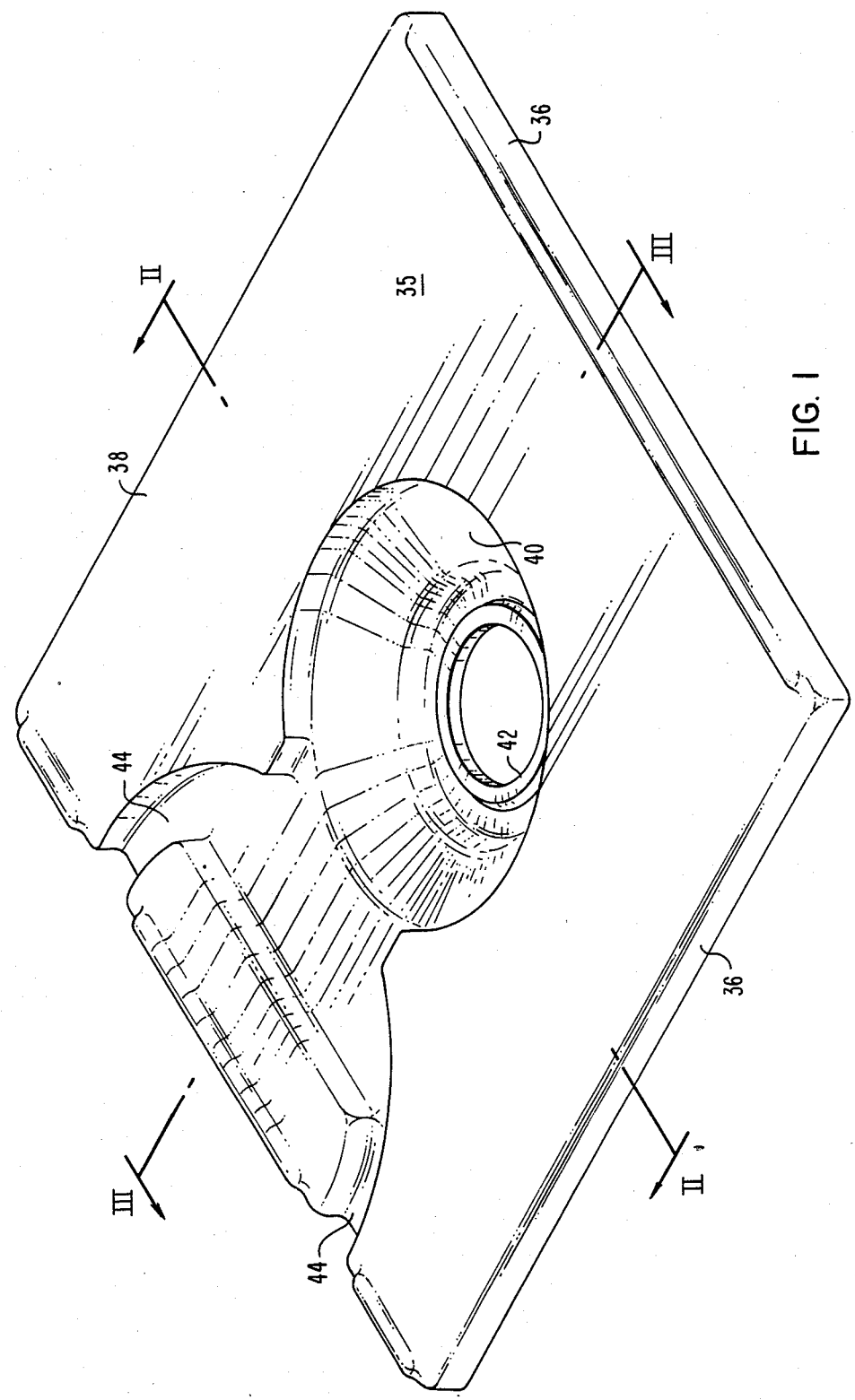
FIG. 1 is a perspective view of the mounting pedestal of this invention.
Figure 2:
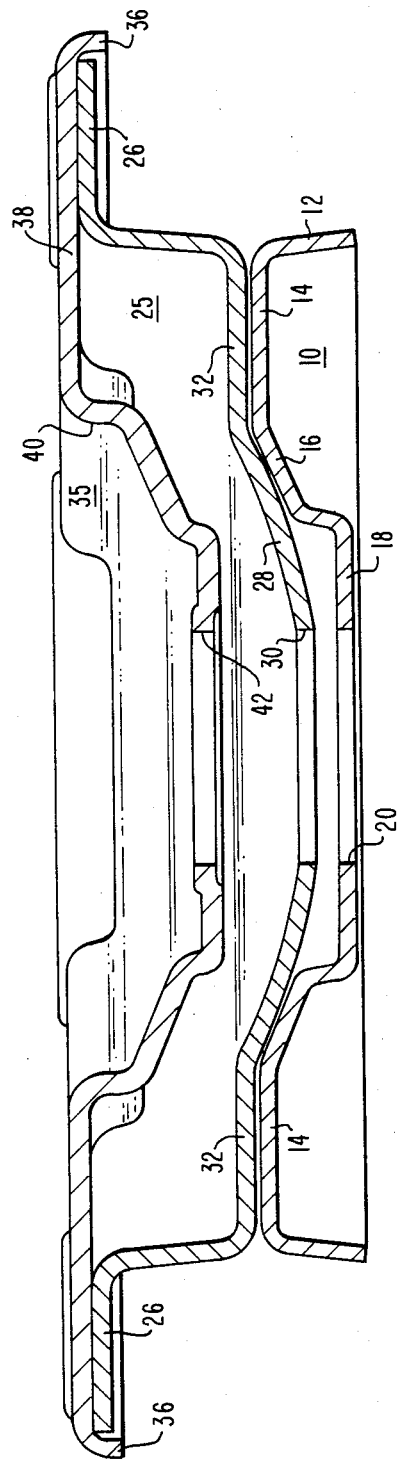
FIG. 2 is a sectional view taken along the line to II—II of FIG. 1.
Figure 3:
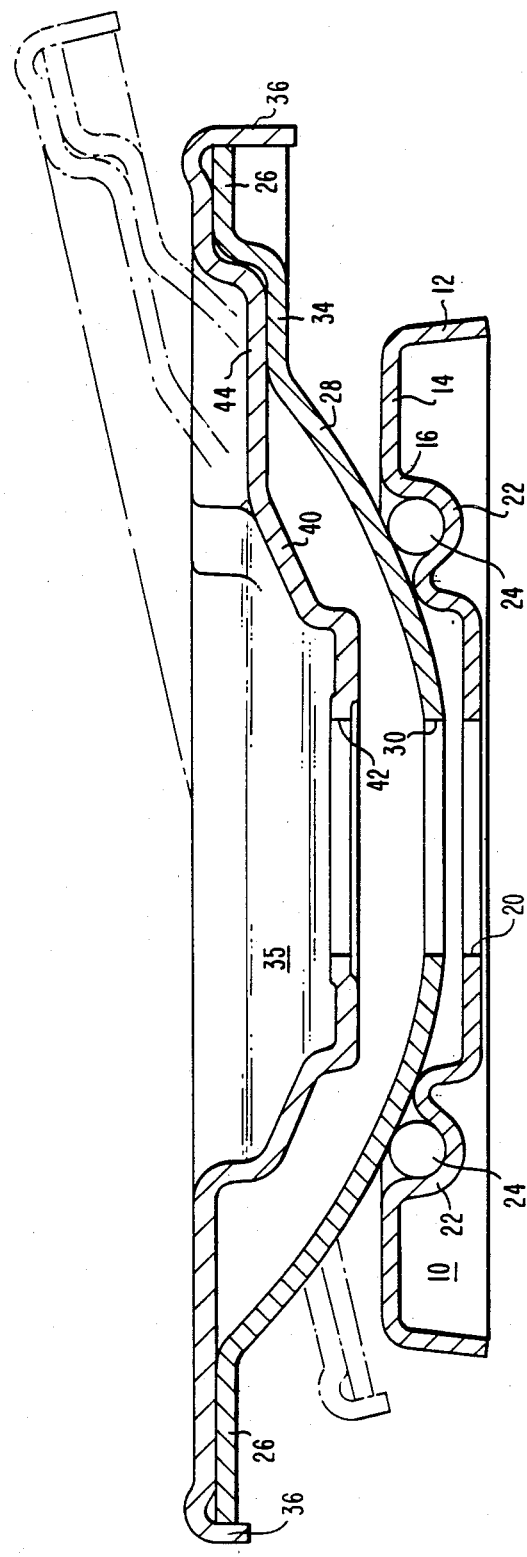
FIG. 3 is a sectional view taken along the line III—III of FIG. 1.

Referring now in detail to the drawing wherein like reference characters represent like parts throughout the several views, there is illustrated in FIGS. 2 and 3 sectional views of the mounting pedestal of this invention. The mounting pedestal includes a base portion generally designated 10 which is preferably circular having a support skirt 12 forming the support leg or circle of the base portion 10 which sits on a desk or table. A generally planar peripheral upper surface area 14 has a central depression therein which is formed by an annular inwardly and downwardly sloped spherical segment 16 and a depressed central portion 18 having a aperture 20 therethrough. The annular downwardly and inwardly sloped spherical segment 16 may have provided therein a plurality of depressions 22 of hemispherical form into which may be disposed ballbearing type spherical elements 24.

Figure 4:
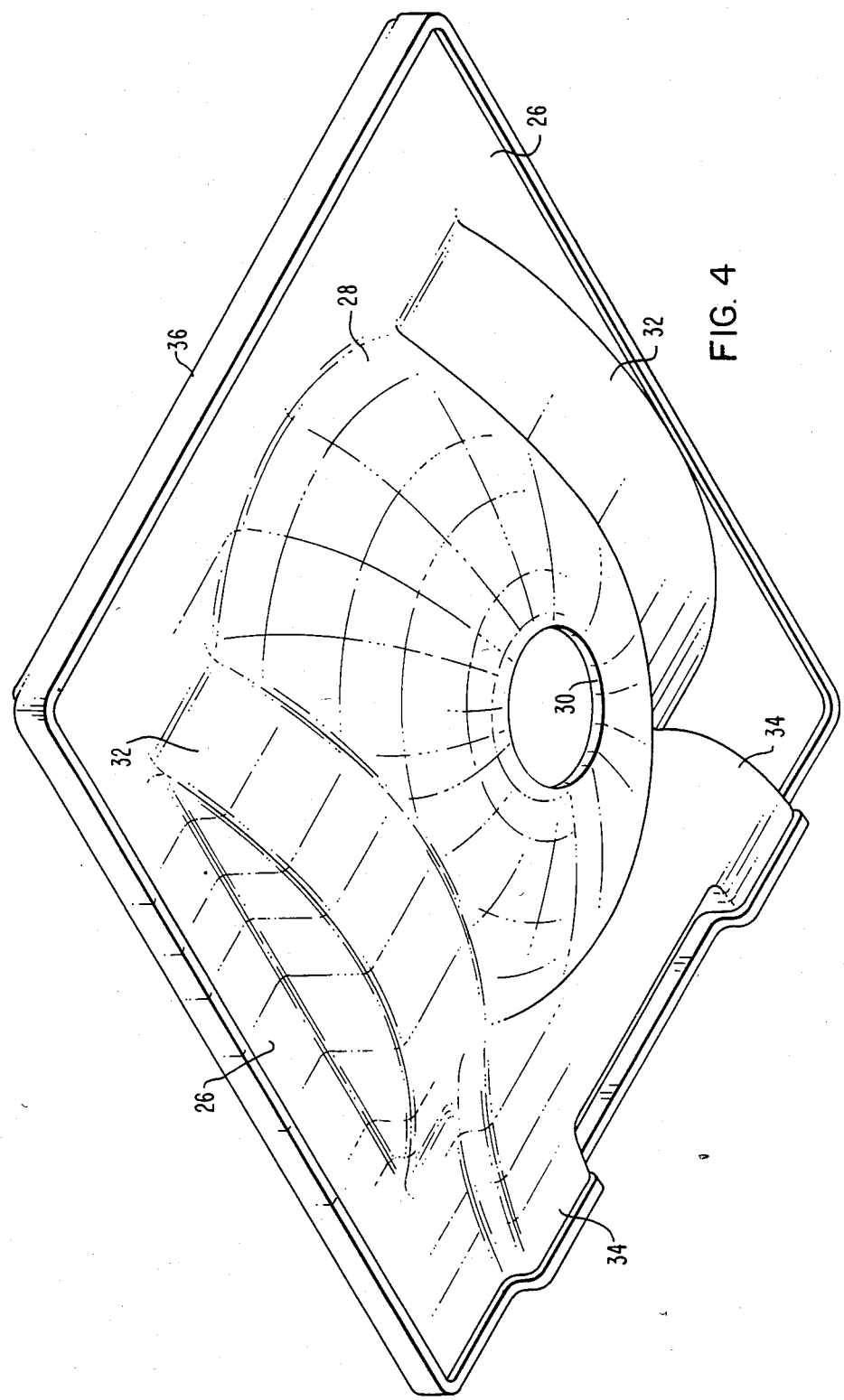
FIG. 4 is a bottom perspective view of the tilt platform of this invention.

The key to the operation of the mounting pedestal of this invention is the tilt platform generally designated 25, the underside of which is best illustrated in FIG. 4. The tilt platform 25 includes a generally planar peripheral top surface 26 and a central, spherical segment, bottom portion 28 with a central aperture therethrough 30. Extending laterally from the central spherical segment bottom portion 28 are a pair of cylindrical segments 32. The cylindrical segments are segments of the same cylinder. The tilt platform 25 also includes at its rearward end arcuate trough portions 34 which accommodate arcuate troughs in the platform top, the function of which will be later described.

Overlying the tilt platform is the platform top which is generally designated 35 and which is generally rectangular and planar and includes a peripheral skirt 36 which surrounds the upper surface of the tilt platform 25. The platform top has a generally planar upper surface 38 for supporting a computer terminal display device or the like and includes a central circular depression 40 which slopes downwardly and inwardly to a central aperture 42. A pair of arcuate troughs 44 communicate between the rear edge of the platform top and the central circular depression 40 to accommodate electrical wiring from the CRT unit in order to provide for 360° rotation of the CRT unit without interference from electrical cords and the like. The cords from the CRT unit which are generally found on the back thereof will enter the tilt platform through the arcuate slots 44 under the CRT unit and into the central depression 40 and proceed downwardly through the aperture 42 and the platform top 35, the central aperture 30 in the tilt platform 25 and exit through the bottom of the base portion 10 through aperture 20. The electrical cords can then pass through a complimentary aperture in the desk or table supporting the mounting pedestal and thereby not only improve office aesthetics by hiding unsightly wiring but still provide the CRT mounted on the mounting pedestal with full rotational and tilting capabilities without the interference of electrical cords.

The peripheral flat portion 26 of the tilt platform may be secured to the underside of the flat CRT support surface 38 of the platform top by cement or any other mechanical means of attachment or, alternatively, the tilt platform and the platform top can be formed as a unitary element so long as the upper contours of the platform top and the underside contours of the tilt platform are maintained.

In operating the device the tilt platform-platform top combination sits on the base 10 freely with contact being maintained between the spherical segment 28 on the underside of the tilt platform and the complimentary spherical segment 16 on the base portion 10. The interaction of these two surfaces will provide for unlimited 360° rotation of the tilt platform and platform top with respect to the base. However, it has been found that ease of rotation can be improved by providing the hemispherical depressions 22 in the spherical segment 16 supplementing the rotational movement with ballbearing like spheres 24. In the preferred embodiment, six spherical depressions 22 are equidistantly spaced 60° apart about the sloped spherical segment 16 and six ballbearing like spheres are located in the hemispherical depressions 22 so that the spherical segment on the underside of the tilt platform will ride for both rotation and tilting on the ball bearing like spheres 24. The laterally extending cylindrical segments 32 on the underside of the tilt platform 25 are designed to lie a fractional distance above the planar peripheral portions 14 of the base portion 10 and the interaction between these two surfaces will permit front to rear tilting of the tilt platform and platform top with respect to the base as illustrated in phantom in FIG. 3 but will positively inhibit any lateral tilting from side to side of the tilt platform top with respect to the base.

As will be apparent from the foregoing, the mounting pedestal of this invention provides for free and uninhibited rotation of the platform top and hence a CRT type display device mounted thereon through 360° about a vertical axis with respect to the base 10 and any table or desk upon which it is located and also free and uninhibited tilting in a front to rearward direction. Furthermore, through the single contoured bottom of the tilt platform 25 and the interaction of the spherical segment 28 and the cylindrical segments 32 any tilting of the CRT display device from side-to-side is completely prohibited.

What is claimed is:

1. A mounting pedestal for supporting a computer terminal display device or the like comprising;
    a base portion having a flat upper peripheral surface, an annular inwardly and downwardly sloped spherical segment interiorly of said flat upper peripheral surface and a central aperture through said base portion;
    a tilt platform having a central spherical segment bottom portion with a central aperture therethrough and laterally extending cylindrical segments extending outwardly of said spherical segment, said spherical segment bottom portion of said tilt platform being complimentary to and constructed and arranged to rest on said spherical segment in said base portion with said outwardly extending cylindrical segments overlying said upper peripheral surface of said base portion; and
    a platform top overlying said tilt platform, said platform top having a planar upper surface with a central aperture therethrough and at least one trough portion in said planar upper surface interconnecting one edge of said platform top with said central aperture.

2. A mounting pedestal according to claim 1 wherein said at least one trough portion is a pair of spaced arcuate trough portions interconnecting at least one edge of said platform top with said central aperture therein.

3. A mounting pedestal according to claim 1 wherein a plurality of hemispherical depressions are provided in the upper surface of said inwardly and downwardly sloped spherical segment and a ballbearing like sphere is disposed in each of said hemispherical depressions, said spherical segment bottom portion of said tilt platform thereby resting on said ball bearing like spheres.

4. The mounting pedestal according to claim 1 wherein said platform top is secured to said tilt platform to form a unitary member.

5. A mounting pedestal for supporting a computer terminal display device or the like comprising;
    a base portion having a flat upper peripheral surface and a central female spherical segment surface therein;
    a tilt platform including a substantially planar platform top having a central male spherical segment in the underside thereof constructed and arranged to be received in said female spherical segment surface in said base portion for relative rotational movement therebetween, said tilt platform further including a pair of laterally extending cylindrical segments on the underside thereof overlying the flat peripheral surface of said base portion preventing lateral tilting of said platform with respect to said base portion while facilitating front to rear tilting of said platform top;
    each of said platform top, male spherical segment and female spherical segment include a central aperture therethrough;
    and wherein said substantially planar platform top includes at least one through portion in the upper surface thereof communicating between said central aperture in said platform top and a side edge thereof.

6. The mounting pedestal according to claim 5 wherein said at least one trough portion is a pair of arcuate troughs.

7. A mounting pedestal according to claim 5 wherein said female spherical segment surface includes a plurality of hemispherical depressions equidistantly spaced therearound and a spherical anti-friction member is disposed in each of said hemispherical depressions whereby said central male spherical segment on the underside of said tilt platform rests for rotation on said spherical anti-friction members.

* * * * *